United States Patent [19]

Bakis et al.

[11] Patent Number: 5,544,277

[45] Date of Patent: Aug. 6, 1996

[54] SPEECH CODING APPARATUS AND METHOD FOR GENERATING ACOUSTIC FEATURE VECTOR COMPONENT VALUES BY COMBINING VALUES OF THE SAME FEATURES FOR MULTIPLE TIME INTERVALS

[75] Inventors: Raimo Bakis; Ponani S. Gopalakrishnan, both of Yorktown Heights; Dimitri Kanevsky, Ossining; Arthur J. Nadas, Rock Tavern; David Nahamoo; Michael A. Picheny, both of White Plains; Jan Sedivy, Hartsdale, all of N.Y.

[73] Assignee: International Business Machines Corporation, Armonk, N.Y.

[21] Appl. No.: 98,682

[22] Filed: Jul. 28, 1993

[51] Int. Cl.⁶ ........................................ G10L 9/00
[52] U.S. Cl. .............................. 395/2.2; 395/2.31
[58] Field of Search ........................ 381/41–45, 36; 395/2–2.31, 2.39, 2.4, 2.52–2.54, 2.59, 2.64–2.66

[56] References Cited

U.S. PATENT DOCUMENTS

| | | | |
|---|---|---|---|
| 4,980,918 | 12/1990 | Bahl et al. | 381/43 |
| 5,031,217 | 7/1991 | Nishimura | 395/2.65 |
| 5,182,773 | 1/1993 | Bahl et al. | 381/41 |
| 5,276,766 | 1/1994 | Bahl et al. | 395/2.65 |
| 5,278,942 | 1/1994 | Bahl et al. | 395/2 |
| 5,280,562 | 1/1994 | Bahl et al. | 395/2 |

OTHER PUBLICATIONS

Bahl, L. R., et al. "Vector Quantization Procedure For Speech Recognition Systems Using Discrete Parameter Phoneme–Based Markov Word Models." *IBM Technical Disclosure Bulletin*, vol. 32, No. 7, Dec. 1989, pp. 320–321.

Jelinek, F. "Continuous Speech Recognition by Statistical Methods." *Proceedings of the IEEE*, vol. 64, No. 4, Apr. 1976, pp. 532–556.

*Primary Examiner*—Allen R. MacDonald
*Assistant Examiner*—Michelle Doerrler
*Attorney, Agent, or Firm*—Marc D. Schechter; Robert P. Tassinari, Jr.

[57] ABSTRACT

A speech coding apparatus and method measures the values of at least first and second different features of an utterance during each of a series of successive time intervals. For each time interval, a feature vector signal has a first component value equal to a first weighted combination of the values of only one feature of the utterance for at least two time intervals. The feature vector signal has a second component value equal to a second weighted combination, different from the first weighted combination, of the values of only one feature of the utterance for at least two time intervals. The resulting feature vector signals for a series of successive time intervals form a coded representation of the utterance. In one embodiment, a first weighted mixture signal has a value equal to a first weighted mixture of the values of the features of the utterance during a single time interval. A second weighted mixture signal has a value equal to a second weighted mixture, different from the first weighted mixture, of the values of the features of the utterance during a single time interval. The first component value of each feature vector signal is equal to a first weighted combination of the values of only the first weighted mixture signals for at least two time intervals, and the second component value of each feature vector signal is equal to a second weighted combination, different from the first weighted combination, of the values of only the second weighted mixture for at least two time intervals.

23 Claims, 2 Drawing Sheets

SPEECH CODING APPARATUS AND METHOD FOR GENERATING ACOUSTIC FEATURE VECTOR COMPONENT VALUES BY COMBINING VALUES OF THE SAME FEATURES FOR MULTIPLE TIME INTERVALS

BACKGROUND OF THE INVENTION

The invention relates to encoding speech with a series of electrical signals, such as for computerized speech recognition.

In a speech recognition computer system, the values of multiple features of all utterance are measured during each of a series of successive time intervals to produce a series of feature vector electrical signals forming a coded representation of the utterance. The series of feature vector signals is modelled to be generated by hidden Markov models of each of a number of words ill a vocabulary in order to estimate, for each word, the probability that tile utterance of the word would have produced the series of observed feature vector signals.

In one technique (U.S. Pat. No. 5,182,773 issued to Bahl et al and entitled "Speaker-Independent Label Coding Apparatus"), the feature vector signal for a selected time interval is obtained by first forming a spliced vector consisting of the values of all measured features during a number of successive time intervals centered on the selected time interval. The spliced vector is then projected down to a smaller number of dimensions to produce the feature vector signal.

For a computer system which measures twenty-one features each time interval, which forms a spliced vector from the values of all twenty-one measured features during nine successive time intervals to form a 189-dimension spliced vector, and which projects the spliced vector down to 50 dimensions, the computer system must provide computer memory to store 50 projection vectors of 189 dimensions each. Moreover, the computer processor must perform 9,450 multiply and add operations to obtain each feature vector.

Producing feature vector signals in this way consumes significant resources. While the computer memory required and the computer processor operations consumed can be decreased by measuring fewer features, or by splicing the features over fewer successive time intervals, it has been found that these modifications cause the quality of speech coding to fall, and the accuracy of the speech recognition based on such speech coding to decrease.

SUMMARY OF THE INVENTION

It is an object of the invention to provide an apparatus and method for generating a series of feature vector signals for each of a series of time intervals to form a coded representation of an utterance, where each feature vector signal is generated from acoustic features measured during a number of time intervals, and which apparatus and method require less computer memory and consume fewer computer processor operations, while maintaining good quality speech coding for accurate speech recognition.

According to the invention, a speech coding apparatus and method measures the values of at least first and second different features of an utterance during each of a series of successive time intervals. A feature vector signal is generated for each time interval, where each feature vector signal has a first component value equal to a first weighted combination of the values of only one feature of the utterance for at least two time intervals. Each feature vector signal has a second component value equal to a second weighted combination, different from the first weighted combination, of the values of only one feature of the utterance for at least two time intervals. The feature vector signals form a coded representation of the utterance.

The first weighted combination may be for the same time intervals as the second weighted combinations.

In an embodiment of the invention, each component value of a feature vector signal for a selected time interval is equal to a weighted combination of the values of only one feature of the utterance for the selected time interval and at least one other time interval. For example, each component value of a feature vector signal for a selected time interval may be equal to a weighted combination of the values of only one feature of the utterance for the selected time interval, four immediately preceding time intervals, and four immediately following time intervals.

In another aspect of the invention, the first component value is equal to the first weighted combination of the values of only a first feature of the utterance for at least two time intervals. The second component value is equal to the second weighted combination, different from the first weighted combination, of the values of only the same first feature of the utterance for at least two time intervals.

According to another variation of the invention, the first component value is equal to the first weighted combination of the values of only a first feature of the utterance for at least two time intervals. The second component value is equal to the second weighted combination, different from the first weighted combination, of the values of only a second feature of the utterance, different from the first feature, for at least two time intervals.

The feature vector signal generating means may further comprise means for generating first and second weighted mixture signals for each time interval. The first weighted mixture signal has a value equal to a first weighted mixture of the values of the features of the utterance during a single time interval. The second weighted mixture signal has a value equal to a second weighted mixture, different from the first weighted mixture, of the values of the features of the utterance during a single time interval. In this embodiment of the invention, the first component value of each feature vector signal is equal to a first weighted combination of the values of only the first weighted mixture signals for at least two time intervals. The second component value of each feature vector signal is equal to a second weighted combination, different from the first weighted combination, of the values of only the second weighted mixture for at least two time intervals.

Each weighted combination may be, for example, a linear weighted combination. Each weighted mixture may be, for example, a linear weighted mixture.

The speech coding apparatus and method according to the present invention may further comprise means for storing a plurality of prototype vector signals. Each prototype vector signal has at least two parameter values and has a unique identification value. The closeness of the component values of a selected feature vector signal is compared to the parameter values of the prototype vector signals to obtain prototype match scores for the selected feature vector signal and each prototype vector signal. At least the identification value of at least the prototype vector signal having the best prototype match score is output as a coded utterance representation signal of the selected feature vector signal.

For measuring the values of the features of an utterance, the speech coding apparatus according to the present invention may further comprise a microphone. The speech coding apparatus may also comprise a spectrum analyzer for measuring the amplitude of the utterance in two or more frequency bands during each of a series of successive time intervals.

By generating each component of a feature vector signal from a weighted combination of only one feature of the utterance for at least two time intervals, a speech coding apparatus and method require less computer memory and consume fewer computer processor operations, while maintaining good quality speech coding for accurate speech recognition.

By generating first and second weighted mixture signals for each time interval, where the first weighted mixture signal has a value equal to a first weighted mixture of the values of the features of the utterance during a single time interval, and the second weighted mixture signal has a value equal to a second weighted mixture, different from the first weighted mixture, of the values of the features of the utterance during a single time interval, and by making the first component value of each feature vector signal equal to a first weighted combination of the values of only the first weighted mixture signals for at least two time intervals, and by making the second component value of each feature vector signal equal to a second weighted combination, different from the first weighted combination, of the values of only the second weighted mixture for at least two time intervals, a speech coding apparatus and method require less computer memory and consume fewer computer processor operations, while maintaining good quality speech coding for accurate speech recognition.

DESCRIPTION OF THE PREFERRED EMBODIMENTS

Figure 1:
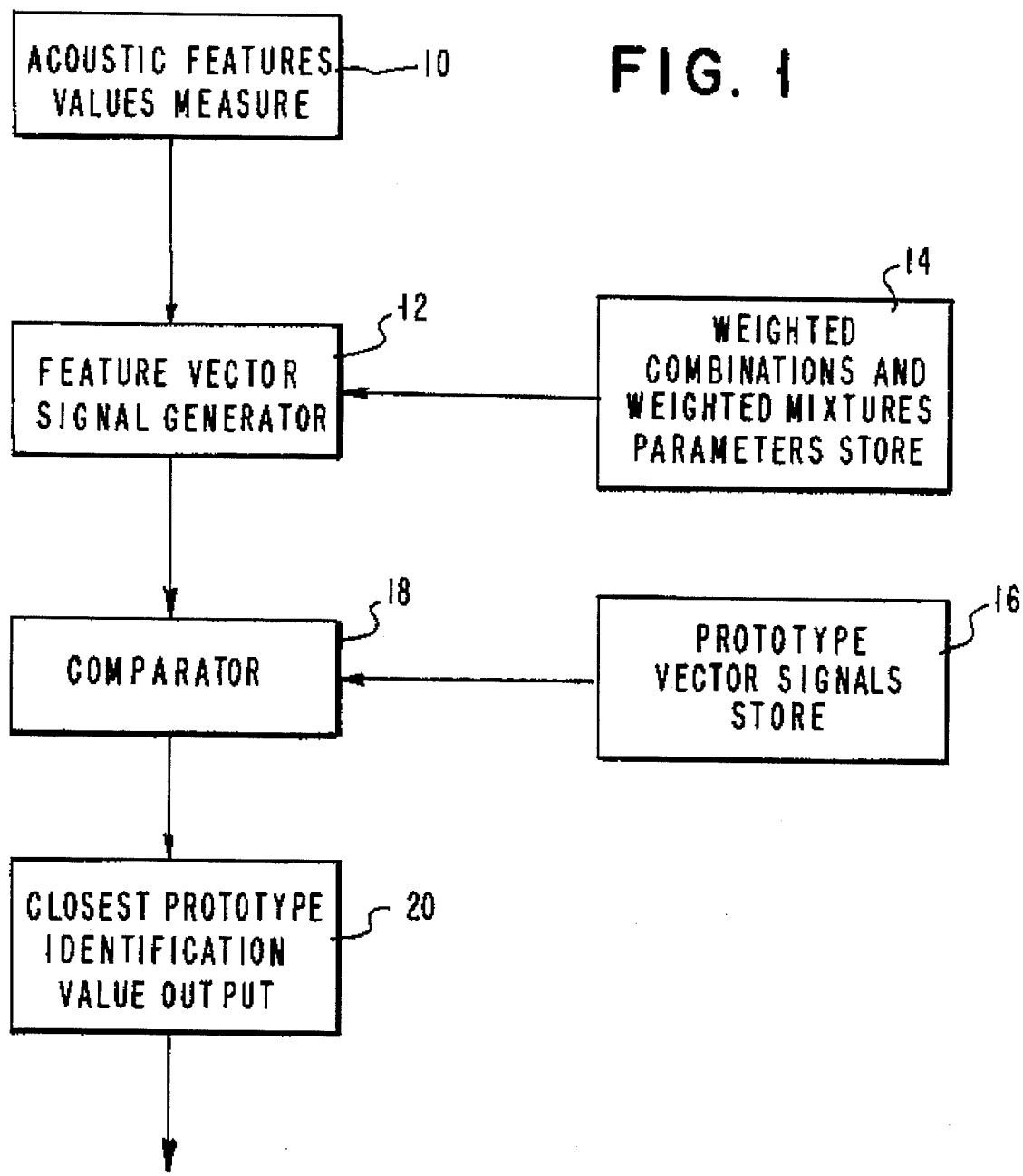
FIG. 1 is a block diagram of an example of a speech coding apparatus according to the invention.

FIG. 1 is a block diagram of an example of a speech coding apparatus according to the invention. The speech coding apparatus comprises an acoustic features values measure 10 for measuring the values of at least first and second different features of an utterance during each of a series of successive time intervals. As described in more detail, below, the acoustic features values measure 10 may, for example, measure the amplitude of an utterance every ten milliseconds in each of twenty frequency bands.

For the purpose of illustrating the speech coding apparatus and method according to the present, invention, Table 1 shows a hypothetical example of the amplitude $E1(t)$ in a frequency band 1, and the amplitude $E2(t)$ in a frequency band 2 of a hypothetical utterance during each of a series of successive time intervals t.

TABLE 1

| Time (t) | MEASURED AMPLITUDES | | | | | | | | | |
|---|---|---|---|---|---|---|---|---|---|---|
| | 0 | 1 | 2 | 3 | 4 | 5 | 6 | 7 | 8 | ... |
| Amplitude E1(t) in Frequency Band 1 | 0.906 | 0.057 | 0.909 | 0.531 | 0.742 | 0.486 | 0.192 | 0.742 | 0.437 | ... |
| Amplitude E2(t) in Frequency Band 2 | 0.423 | 0.998 | 0.417 | 0.847 | 0.670 | 0.874 | 0.981 | 0.670 | 0.899 | ... |

The amplitudes $Ei(t)$ may be the measured amplitudes of the utterance in two or more frequency bands, or may be formed of the components of any other vector which is related to or derived from the measured amplitudes of the utterance in two or more frequency bands during each of a series of successive time intervals.

Returning to FIG. 1, the speech coding apparatus further comprises a feature vector signal generator 12 for generating a feature vector signal for each time interval. Using parameters obtained from weighted combinations and weighted mixtures parameters store 14, each feature vector signal generated by feature vector signal generator 12 has a first component value equal to a first weighted combination of the values of only one feature of the utterance for at least two time intervals. Each feature vector signal also has a second component value equal to a second weighted combination, different from the first weighted combination, of the values of only one feature of the utterance for at least two time intervals. The resulting feature vector signals produced by feature vector signals generator 12 form a coded representation of the utterance.

In one embodiment of the invention, the feature vector signal generator 12 further comprises means for generating first and second weighted mixture signals for each time interval. The first weighted mixture signal has a value equal to a first weighted mixture of the values of the features of the utterance during a single time interval. The second weighted mixture signal has a value equal to a second weighted mixture, different from the first weighted mixture, of the values of the features of the utterance during a single time interval.

In this case, the first component value of each feature vector signal produced by the feature vector signal generator 12 is equal to a first weighted combination of the values of only the first weighted mixture signals for at least two time intervals. The second component value of each feature vector signal is equal to a second weighted combination, different from the first weighted combination, of the values of only the second weighted mixture for at least two time intervals.

Preferably, the first weighted mixture is for the same single time interval as the second weighted mixture.

Table 2 shows a hypothetical example of first and second weighted mixtures of the amplitudes of an utterance in two frequency bands during a single time interval t. Each weighted mixture $Fj(t)$ is given by Equation 1

$$Fj(t) = p(j)A1(t) + q(j)A2(t) \qquad [1]$$

where j=1 for the first weighted mixture, and j=2 for the second weighted mixture, and where p(j) and q(j) are the weighted mixtures parameters stored in weighted combinations and weighted mixtures parameters store 14.

TABLE 2

WEIGHTED MIXTURES PARAMETERS
Weighted Mixture: $Fj(t) = p(j)A1(t) + q(j)A2(t)$

|  | p(j) | q(j) |
|---|---|---|
| First Weighted Mixture (j = 1): | 0.86 | 0.14 |
| Second Weighted Mixture (j = 2): | 0.21 | 0.79 |

Table 3 shows a hypothetical example of the values F1(t) and F2(t) of the first and second weighted mixtures, respectively, of the hypothetical measured amplitudes of Table 1, using the weighted mixtures parameters of Table 2, for a number of time intervals t.

TABLE 3

WEIGHTED MIXTURES VALUES

| Time (t) | 0 | 1 | 2 | 3 | 4 | 5 | 6 | 7 | 8 | ... |
|---|---|---|---|---|---|---|---|---|---|---|
| First Weighted Mixture Value F1(t) | 0.838 | 0.189 | 0.840 | 0.575 | 0.732 | 0.540 | 0.302 | 0.732 | 0.502 | ... |
| Second Weighted Mixture Value F2(t) | 0.524 | 0.800 | 0.520 | 0.781 | 0.685 | 0.793 | 0.815 | 0.685 | 0.802 | ... |

Table 4 shows a hypothetical example of first, second, and third weighted combinations of only one feature (for example, weighted mixture) of the utterance. The first weighted combination is of the values of only the first weighted mixture of the utterance, the second weighted combination is of the values of only the first weighted mixture of the utterance, and the third weighted combination is of the values of only the second weighted mixture of the utterance. In this example, the weighted combination for a time interval t is obtained over time intervals (t−1), (t), and (t+1). Table 4 also shows hypothetical values for the parameters of each weighted combination

TABLE 4

WEIGHTED COMBINATIONS PARAMETERS
Weighted Combination: $Qn(t) = x(n)Fj(t - 1) + y(n)Fj(t) + z(n)Fj(t + 1)$

|  | Feature | | | |
|---|---|---|---|---|
|  | (j) | x(n) | y(n) | z(n) |
| First Weighted Combination (n = 1): | 1 | 0.75 | 0.08 | 0.17 |
| Second Weighted Combination (n = 2) | 1 | 0.00 | 0.15 | 0.85 |
| Third Weighted Combination (n = 3): | 2 | −0.22 | 0.69 | 0.33 |

Each weighted combination Qn(t) is given by Equation 2

$$Qn(t) = x(n)Fj(t-1) + y(n)Fj(t) + z(n)Fj(t+1) \quad [2]$$

where n=1 for the first weighted combination, n=2 for the second weighted combination, n=3 for the third weighted combination, j=1 for the first feature, j=2 for the second feature, Fj(t) is the value of feature (for example, weighted mixture) j at time t, and x(n), y(n), and z(n) are the weighted combinations parameters.

In this example, tile first weighted combination is for the same time intervals as the second weighted combination. Each component value for a selected time interval t is equal to a weighted combination of the values of only one feature (for example, weighted mixture) of the utterance for the selected time interval t and one immediately preceding time interval (t−1) and one immediately following time interval (t+1). Alternatively, for example, each component value of a feature vector signal for a selected time interval may be equal to a weighted combination of the values of only one feature of the utterance for the selected time interval, four immediately preceding time intervals, and four immediately following time intervals.

Table 5 is a hypothetical example of feature vectors component values obtained by the weighted combination according to Equation 2 of the weighted mixtures values of Table 3 using the weighted combinations parameters of Table 4.

TABLE 5

FEATURE VECTORS COMPONENT VALUES

| Time (t)<br>Feature Vector Q(t) | 0<br>Q(0) | 1<br>Q(1) | 2<br>Q(2) | 3<br>Q(3) | 4<br>Q(4) | 5<br>Q(5) | 6<br>Q(6) | 7<br>Q(7) | ... |
|---|---|---|---|---|---|---|---|---|---|
| First Component Value Q1(t) | 0.099 | 0.786 | 0.307 | 0.800 | 0.582 | 0.644 | 0.554 | 0.370 | ... |
| Second Component Value Q2(t) | 0.286 | 0.742 | 0.615 | 0.708 | 0.569 | 0.338 | 0.668 | 0.537 | ... |
| Third Component Value Q3(t) | 0.626 | 0.608 | 0.441 | 0.651 | 0.563 | 0.665 | 0.614 | 0.558 | ... |

In this example, both the first component value Q1(t) and the second component value Q2(t) are equal to weighted combinations of the values of only the first feature (for example, weighted mixture) of the utterance. The third component value is equal to a weighted combination of the values of the second feature (for example, weighted mixture) of the utterance, different from the first feature.

Preferably, as shown in Equations 1 and 2, each weighted mixture is a linear weighted mixture, and each weighted combination is a linear weighted combination.

Returning to FIG. 1, the speech coding apparatus may further comprise a prototype vector signals store 16 for storing a plurality of prototype vector signals. Each prototype vector signal has at least two parameter values and has a unique identification value. A comparator 18 compares the closeness of the component values of a selected feature vector signal from feature vector signal generator 12 to the parameter values of the prototype vector signals to obtain prototype match scores for the selected feature vector signal and each prototype vector signal. A closest prototype identification value output 20 outputs at least the identification value of at least the prototype vector signal having the best prototype match score as a coded utterance representation signal of the selected feature vector signal.

Figure 2:
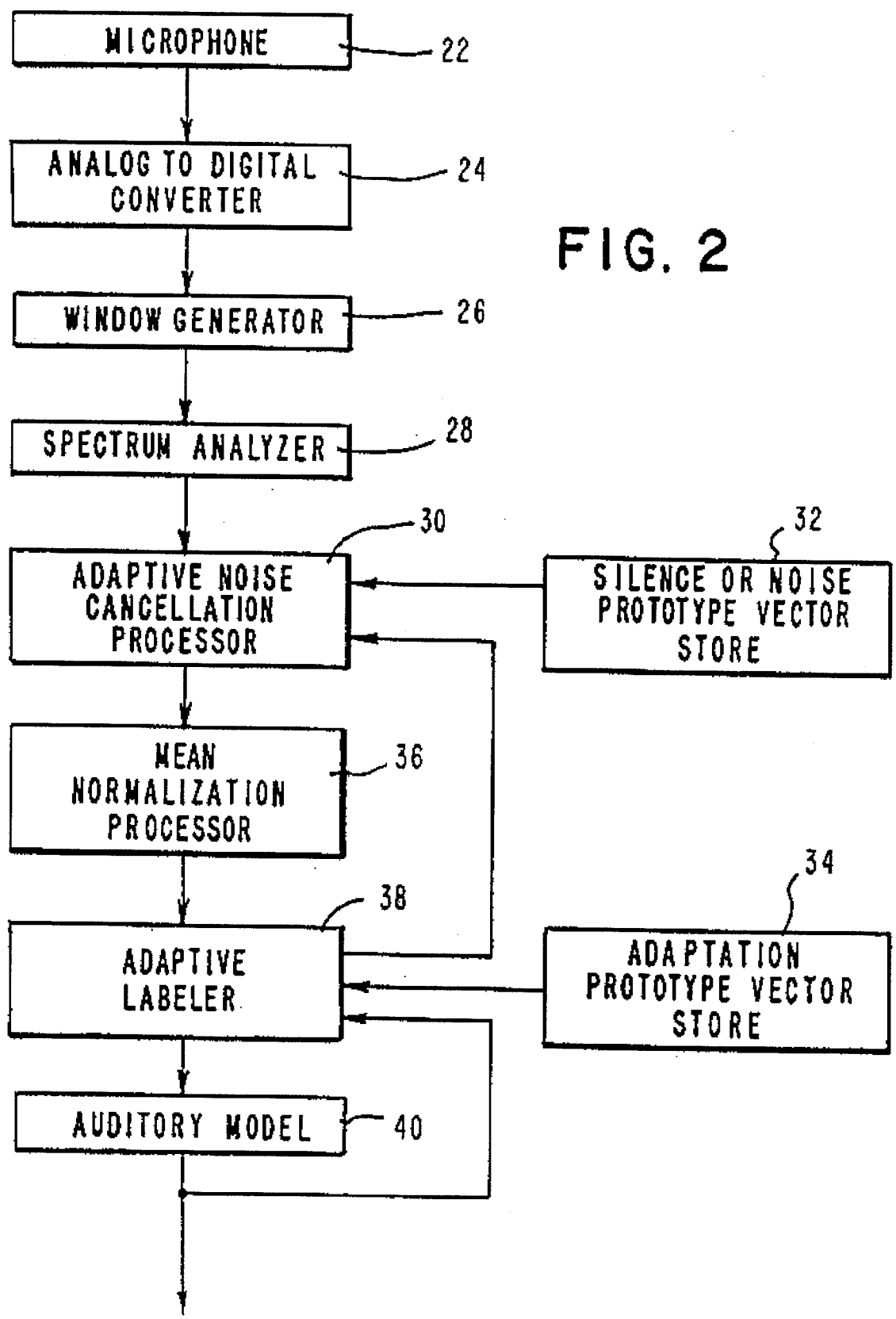
FIG. 2 is a block diagram of an example of the acoustic features values measure of FIG. 1.

One example of the acoustic features values measure 10 of FIG. 1 is shown in FIG. 2. The acoustic features values measure 10 comprises a microphone 22 for generating an analog electrical signal corresponding to the utterance. The analog electrical signal from microphone 22 is converted to a digital electrical signal by analog to digital converter 24. For this purpose, tile analog signal may be sampled, for example, at a rate of twenty kilohertz by the analog to digital converter 24.

A window generator 26 obtains, for example, a twenty millisecond duration sample of the digital signal from analog to digital converter 24 every ten milliseconds (one centisecond). Each twenty millisecond sample of the digital signal is analyzed by spectrum analyzer 28 in order to obtain the amplitude of the digital signal sample in each of, for example, twenty frequency bands. Preferably, spectrum analyzer 28 also generates a signal representing the total amplitude or total energy of the twenty millisecond digital signal sample. For reasons further described below, if the total energy is below a threshold, the twenty millisecond digital signal sample is considered to represent silence. The spectrum analyzer 28 may be, for example, a fast Fourier transform processor. Alternatively, it may be a bank of twenty band pass filters.

The twenty dimension acoustic vector signals produced by spectrum analyzer 28 may be adapted to remove background noise by an adaptive noise cancellation processor 30. Noise cancellation processor 30 subtracts a noise vector N(t) from the acoustic vector F(t) input into the noise cancellation processor to produce an output acoustic information vector F(t). The noise cancellation processor 30 adapts to changing noise levels by periodically updating the noise vector N(t) whenever the prior acoustic vector F(t−1) is identified as noise or silence. The noise vector N(t) is updated according to the formula $$N(t) = \frac{N(t-1) + k[F(t-1) - Fp(t-1)]}{(1+k)},  \quad [3]$$

where N(t) is the noise vector at time t, N(t−1) is the noise vector at time (t−1), k is a fixed parameter of the adaptive noise cancellation model, F(t−1) is the acoustic vector input into the noise cancellation processor 30 at time (t−1) and which represents noise or silence, and Fp(t−1) is one silence or noise prototype vector, from store 32, closest to acoustic vector F(t−1).

The prior acoustic vector F(t−1) is recognized as noise or silence if either (a) the total energy of the vector is below a threshold, or (b) the closest prototype vector in adaptation prototype vector store 34 to the acoustic vector is a prototype representing noise or silence. For the purpose of the analysis of the total energy of the acoustic vector, the threshold may be, for example, the fifth percentile of all acoustic vectors (corresponding to both speech and silence) produced in the two seconds prior to the acoustic vector being evaluated.

After noise cancellation, the acoustic information vector F(t) is normalized to adjust for variations in the loudness of the input speech by short term mean normalization processor 36. Normalization processor 36 normalizes the twenty dimension acoustic information vector F(t) to produce a twenty dimension normalized vector X(t). Each component i of the normalized vector X(t) at time t may, for example, be given by the equation $$X_i(t) = F'_i(t) - Z(t) \quad [4]$$

in the logarithmic domain, where $F'_i(t)$ is the i-th component of the unnormalized vector at time t, and where Z(t) is a weighted mean of the components of F'(t) and Z(t−1) according to Equations 5 and 6:

$$Z(t) = 0.9Z(t-1) + 0.1M(t) \quad [5]$$

and where $$M(t) = \frac{1}{20} \sum_i F_i'(t) \quad [6]$$

The normalized twenty dimension vector X(t) may be further processed by an adaptive labeler 38 to adapt to variations in pronunciation of speech sounds. A twenty-dimension adapted acoustic vector X'(t) is generated by subtracting a twenty dimension adaptation vector A(t) from the twenty dimension normalized vector X(t) provided to the input of the adaptive labeler 38. The adaptation vector A(t) at time t may, for example, be given by the formula $$A(t) = \frac{A(t-1) + k[X(t-1) - Xp(t-1)]}{(1+k)}, \quad [7]$$

where k is a fixed parameter of the adaptive labeling model, X(t−1) is the normalized twenty dimension vector input to the adaptive labeler 38 at time (t−1), Xp(t−1) is the adaptation prototype vector (from adaptation prototype store 34) closest to the twenty dimension normalized vector X(t−1) at time (t−1), and A(t−1) is the adaptation vector at time (t−1).

The twenty-dimension adapted acoustic vector signal X'(t) from the adaptive labeler 38 is preferably provided to an auditory model 40. Auditory model 40 may, for example, provide a model of low the human auditory system perceives sound signals. An example of an auditory model is described in U.S. Pat. No. 4,980,918 to Bahl et al entitled "Speech Recognition System with Efficient Storage and Rapid Assembly of Phonological Graphs".

Preferably, according to the present invention, for each frequency band i of the adapted acoustic vector signal X'(t) at time t, the auditory model 40 calculates a new parameter $E_i(t)$ according to Equations 8 and 9:

$$E_i(t) = (K_1 + K_2 X'_i(t)) (N_1(t-1) + K_4 X'_i(t)) \quad [8]$$

where $$N_i(t) = K_3 \times N_i(t-1) - E_1(t) \quad [9]$$

and where $K_1$, $K_2$, $K_3$, and $K_4$ are fixed parameters of the auditory model.

For each centisecond time interval, the output of the auditory model 40 is a modified twenty-dimension amplitude vector signal. This amplitude vector is augmented by a twenty-first dimension having a value equal to the square root of the sum of the squares of the values of the other twenty dimensions.

The measured features of the utterance according to tile present invention may comprise the components of the 21-dimension amplitude vector produced by the auditory model 40. Alternatively, the measured features may comprise the components of the output vector X'(t) from the adaptive labeller 38, the components of the output vector X(t) from the mean normalization processor 36, or the components of any other vector related to or derived from the amplitudes of the utterance in two or more frequency bands during a single time interval. The measured features thus obtained may then be combined, with or without prior mixing, by feature vector signal generator 12 in the manner described above.

When each feature is a weighted mixture of the components of a 21-dimension amplitude vector, the weighted mixtures parameters may be obtained, for example, by classifying into M classes a set of 21-dimension amplitude vectors obtained during a training session of utterances of known words by one speaker (in the case of speaker-dependent speech coding) or many speakers (in the case of speaker-independent speech coding). The covariance matrix for all of the 21-dimension amplitude vectors in the training set is multiplied by the inverse of the within-class covariance matrix for all of the amplitude vectors in all M classes. The first 21 eigenvectors of the resulting matrix form the weighted mixtures parameters. (See, for example, "Vector Quantization Procedure for Speech Recognition Systems Using Discrete Parameter Phoneme-Based Markov Word Models" by L. R. Bahl, et al. *IBM Technical Disclosure Bulletin*, Vol. 32, No. 7, December 1989, pages 320 and 321). Each weighted mixture is obtained by multiplying a 21-dimension amplitude vector by an eigenvector.

In order to discriminate between phonetic units, the 21-dimension amplitude vectors from auditory model 40 may be classified into M classes by tagging each amplitude vector with the identification of its corresponding phonetic unit obtained by Viterbi aligning the series of amplitude vector signals corresponding to the known training utterance with phonetic unit models in a model (such as a Markov model) of the known training utterance. (See, for example, F. Jelinek. "Continuous Speech Recognition By Statistical Methods." *Proceedings of the IEEE*, Vol. 64, No. 4, April 1976, pages 532–556.)

The weighted combinations parameters may be obtained, for example, as follows. Let $X_j(t)$ represent the component j of the 21-dimension vector obtained from the twenty-one weighted mixtures of the components of the amplitude vector from auditory model 40 at time t from the training utterance of known words. For each j in the range from 1 to 21, and for each time interval t, a new vector $Y_j(t)$ is formed whose components are $X_j(t-4)$, $X_j(t-3)$, $X_j(t-2)$, $X_j(t-1)$, $X_j(t)$, $X_j(t+1)$, $X_j(t+2)$, $X_j(t+3)$, and $X_j(t+4)$. For each value of j from 1 to 21, the vectors $Y_j(t)$ are classified into N classes (such as by Viterbi aligning each vector to a phonetic model in the manner described above). For each of the twenty-one collections of 9-dimension vectors (that is, for each value of j from 1 to 21) the covariance matrix for all of the vectors $Y_j(t)$ in the training set is multiplied by the inverse of the within-class covariance matrix for all of the vectors $Y_j(t)$ in all classes. (See, for example, "Vector Quantization Procedure for Speech Recognition Systems Using Discrete Parameter Phoneme-Based Markov Word Models" by L. R. Bahl, et al. *IBM Technical Disclosure Bulletin*, Vol. 32, No. 7, December 1989, pages 320 and 321).

For each value of j (that is, for each feature produced by the weighted mixtures), the first nine eigenvectors of the resulting matrix, and the corresponding eigenvalues are identified. For all twenty-one features, a total of 189 eigenvectors are identified. The fifty eigenvectors from this set of 189 eigenvectors having the highest eigenvalues, along with an index identifying each eigenvector with the feature j from which it was obtained, form the weighted combinations parameters. A weighted combination of the values of a feature of the utterance is then obtained by multiplying a selected eigenvector having an index j by a vector $Y_j(t)$.

In the speech coding apparatus according to the present invention, the feature vector signal generator 12 and the comparator 18 may be suitably programmed special purpose or general purpose digital signal processors. Weighted combinations and weighted mixtures parameters store 14 and prototype vector signals store 16 may be electronic read only or read/write computer memory.

In the acoustic features values measure 10, window generator 26, spectrum analyzer 28, adaptive noise cancellation processor 30, short term mean normalization processor 36, adaptive labeller 38, and auditory mode 40 may be suitably programmed special purpose or general purpose digital signal processors. Prototype vector stores 32 and 34 may be electronic computer memory of the types discussed above.

The prototype vector signals in prototype vector signals store 16 may be obtained, for example, by clustering feature vector signals from a training set into a plurality of clusters, and then calculating the mean and standard deviation for each cluster to form the parameter values of the prototype vector. When the training script comprises a series of word-segment models (forming a model of a series of words), and each word-segment model comprises a series of elementary models having specified locations in the word-segment models, the feature vector signals may be clustered by specifying that each cluster corresponds to a single elementary model in a single location in a single-word model. Such a method is described in more detail in U.S. Pat. No. 5,276,766 filed on Jul. 16, 1991, entitled "Fast Algorithm For Deriving Acoustic Prototypes For Automatic Speech Recognition" by L. R. Bahl et al.

Alternatively, all acoustic feature vectors generated by the utterance of a training text and which correspond to a given elementary model may be clustered by K-means Euclidean clustering or K-means Gaussian clustering, or both. Such a method is described, for example, by Bahl et al in U.S. Pat. No. 5,182,773 entitled "Speaker Independent Label Coding Apparatus".

We claim:

1. A speech coding apparatus comprising:

means for measuring the values of at least first and second different features of an utterance during each of a series of successive time intervals; and means for generating a feature vector signal for each time interval, each feature vector signal having a first component value equal to a first weighted combination of the values of only one feature of the utterance for at least two time intervals, each feature vector signal having a second component value equal to a second weighted combination, different from the first weighted combination, of the values of only one feature of the utterance for at least two time intervals, said feature vector signals forming a coded representation of the utterance.

2. A speech coding apparatus as claimed in claim 1, characterized in that the first weighted combination is for the same time intervals as the second weighted combination.

3. A speech coding apparatus as claimed in claim 2, characterized in that each component value of a feature vector signal for a selected time interval is equal to a weighted combination of the values of only one feature of the utterance for the selected time interval and at least one other time interval.

4. A speech coding apparatus as claimed in claim 3, characterized in that each component value of a feature vector signal for a selected time interval is equal to a weighted combination of the values of only one feature of the utterance for the selected time interval, four immediately preceding time intervals and four immediately following time intervals.

5. A speech coding apparatus as claimed in claim 2, characterized in that:

the first component value is equal to the first weighted combination of the values of only the first feature of the utterance for at least two time intervals; and the second component value is equal to the second weighted combination, different from the first weighted combination, of the values of only the first feature of the utterance for at least two time intervals.

6. A speech coding apparatus as claimed in claim 2, characterized in that:

the first component value is equal to the first weighted combination of the values of only the first feature of the utterance for at least two time intervals; and the second component value is equal to the second weighted combination, different from the first weighted combination, of the values of only the second feature of the utterance, different from the first feature, for at least two time intervals.

7. A speech coding apparatus as claimed in claim 2, characterized in that:

the feature vector signal generating means further comprises means for generating first and second weighted mixture signals for each time interval, said first weighted mixture signal having a value equal to a first weighted mixture of the values of the features of the utterance during a single time interval, said second weighted mixture signal having a value equal to a second weighted mixture, different from the first weighted mixture, of the values of the features of the utterance during a single time interval;

the first component value of each feature vector signal is equal to a first weighted combination of the values of only the first weighted mixture signals for at least two time intervals; and the second component value of each feature vector signal is equal to a second weighted combination, different from the first weighted combination, of the values of only the second weighted mixture for at least two time intervals.

8. A speech coding apparatus as claimed in claim 7, characterized in that the first weighted mixture is for the same single time interval as the second weighted mixture.

9. A speech coding apparatus as claimed in claim 8, characterized in that:

each weighted combination is a linear weighted combination; and each weighted mixture is a linear weighted mixture.

10. A speech coding apparatus as claimed in claim 2, further comprising:

means for storing a plurality of prototype vector signals, each prototype vector signal having at least two parameter values and having a unique identification value;

means for comparing the closeness of the component values of a selected feature vector signal to the parameter values of the prototype vector signals to obtain prototype match scores for the selected feature vector signal and each prototype vector signal; and means for outputting at least the identification value of at least the prototype vector signal having the best prototype match score as a coded utterance representation signal of the selected feature vector signal.

11. A speech coding apparatus as claimed in claim 2, characterized in that the measuring means comprises a microphone.

12. A speech coding apparatus as claimed in claim 11, characterized in that the measuring means comprises a spectrum analyzer for measuring the amplitudes of the utterance in two or more frequency bands during each of a series of successive time intervals.

13. A speech coding method comprising the steps of:

measuring the values of at least first and second different features of an utterance during each of a series of successive time intervals; and generating a feature vector signal for each time interval, each feature vector signal having a first component value equal to a first weighted combination of the values of only one feature of the utterance for at least two time intervals, each feature vector signal having a second component value equal to a second weighted combination, different from the first weighted combination, of the values of only one feature of the utterance for at least two time intervals, said feature vector signals forming a coded representation of the utterance.

14. A speech coding method as claimed in claim 13, characterized in that the first weighted combination is for the same time intervals as the second weighted combination.

15. A speech coding method as claimed in claim 14, characterized in that each component value of a feature vector signal for a selected time interval is equal to a weighted combination of the values of only one feature of the utterance for the selected time interval and at least one other time interval.

16. A speech coding method as claimed in claim 15, characterized in that each component value of a feature vector signal for a selected time interval is equal to a weighted combination of the values of only one feature of the utterance for the selected time interval, four immediately preceding time intervals and four immediately following time intervals.

17. A speech coding method as claimed in claim 14, characterized in that:

the first component value is equal to the first weighted combination of the values of only the first feature of the utterance for at least two time intervals; and the second component value is equal to the second weighted combination, different from the first weighted combination, of the values of only the first feature of the utterance for at least two time intervals.

18. A speech coding method as claimed in claim 14, characterized in that:

the first component value is equal to the first weighted combination of the values of only the first feature of the utterance for at least two time intervals; and the second component value is equal to the second weighted combination, different from the first weighted combination, of the values of only the second feature of the utterance, different from the first feature, for at least two time intervals.

19. A speech coding method as claimed in claim 14, characterized in that:

the step of generating a feature vector signal further comprises the step of generating first and second weighted mixture signals for each time interval, said first weighted mixture signal having a value equal to a first weighted mixture of the values of the features of the utterance during a single time interval, said second weighted mixture signal having a value equal to a second weighted mixture, different from the first weighted mixture, of the values of the features of the utterance during a single time interval;

the first component value of each feature vector signal is equal to a first weighted combination of the values of only the first weighted mixture signals for at least two time intervals; and the second component value of each feature vector signal is equal to a second weighted combination, different from the first weighted combination, of the values of only the second weighted mixture for at least two time intervals.

20. A speech coding method as claimed in claim 19, characterized in that the first weighted mixture is for the same single time interval as the second weighted mixture.

21. A speech coding method as claimed in claim 20, characterized in that:

each weighted combination is a linear weighted combination; and each weighted mixture is a linear weighted mixture.

22. A speech coding method as claimed in claim 14, further comprising the steps of:

storing a plurality of prototype vector signals, each prototype vector signal having at least two parameter values and having a unique identification value;

comparing the closeness of the component values of a selected feature vector signal to the parameter values of the prototype vector signals to obtain prototype match scores for the selected feature vector signal and each prototype vector signal; and outputting at least the identification value of at least the prototype vector signal having the best prototype match score as a coded utterance representation signal of the selected feature vector signal.

23. A speech coding method as claimed in claim 14, characterized in that the step of measuring comprises measuring the amplitudes of the utterance in two or more frequency bands during each of a series of successive time intervals.

* * * * *